June 1, 1954 — J. P. SAPP ET AL — 2,679,886

TIRE BUILDING APPARATUS

Original Filed June 1, 1950

Inventor
John P. Sapp
Frank S. Sternad
By
Atty.

Patented June 1, 1954

2,679,886

UNITED STATES PATENT OFFICE 2,679,886

TIRE BUILDING APPARATUS

John P. Sapp, Kent, and Frank S. Sternad, Cuyahoga Falls, Ohio, assignors to The B. F. Goodrich Company, New York, N. Y., a corporation of New York Continuation of abandoned application Serial No. 165,472, June 1, 1950. This application May 28, 1953, Serial No. 358,142

10 Claims. (Cl. 154—9)

This invention relates to tire building apparatus and more particularly to bead-setting apparatus therefor. The invention is especially useful in the building of tires by the flat-band method where the tire material is assembled about a relatively flat-faced drum.

This application is a continuation of our copending application Serial No. 165,472, filed June 1, 1950, now abandoned.

In the manufacture of tire casings, it has been proposed to assemble bands or strips of cord material about a rotatable drum having a substantially cylindrical face, to mount inextensible bead cores at the margins of the drum and to form the rubberized cord material about the bead cores to anchor them in place. Such bead cores have generally been provided with strips of cord or fabric material generally known as "flipper strips," the inextensible portion of the bead core being enclosed by a longitudinal fold of the flipper strip and the margins of the flipper strip being pasted together with their margins offset from each other. In the manufacture of such tires it is desirable to provide for supporting the bead core together with its flipper strip in aligned position with the building drum so that good support of the bead core is provided while its flipper strip is being united with the other material of the tire.

The building drum is usually of the collapsible type so that the finished tire may be readily removed therefrom and this necessitates so mounting the bead-supporting ring as to permit its being swung clear of the building drum for removal of the tire. Supports heretofore proposed for the bead ring, especially at the outboard end of the drum, have presented certain disadvantages in that in the displaced position the bead ring was in the way of the operator, and in the bead-placing position the ring was not supported with sufficient rigidity to permit the desired operation.

The present invention aims to overcome the foregoing and other difficulties.

Objects of the invention are to provide stable support of the bead setting ring, to provide free rotation of the ring at all positions, to provide for transferring of the ring to the displaced position without its being in the way of the operator, to provide simplicity of mechanism and stability of structure.

These and other objects will appear from the following description and the accompanying drawings.

Figure 1:
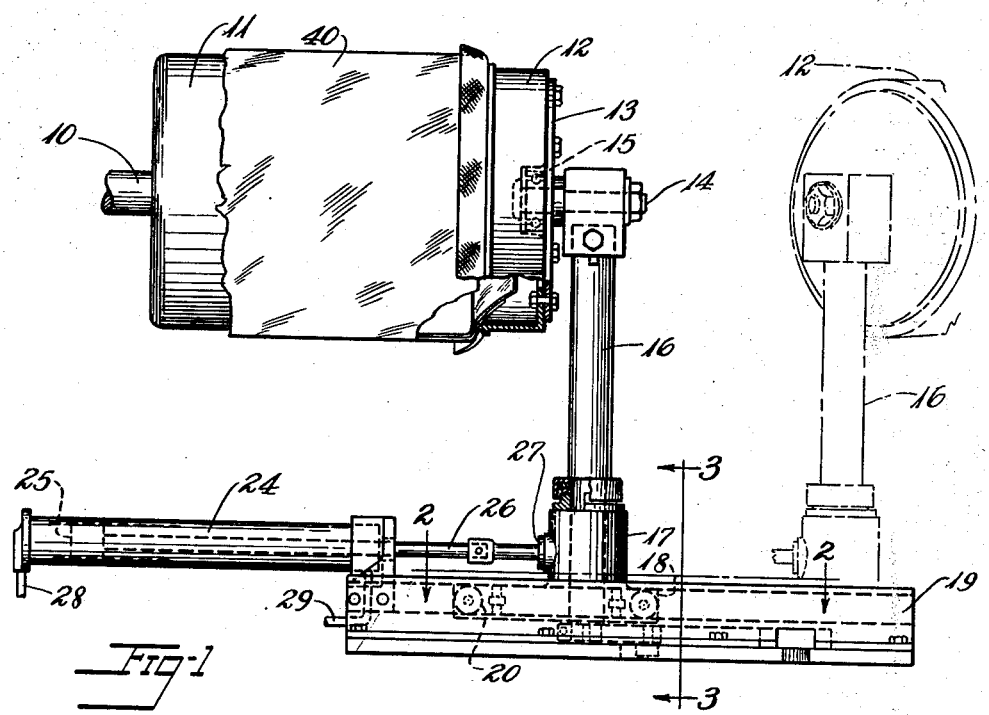
Figure 2:
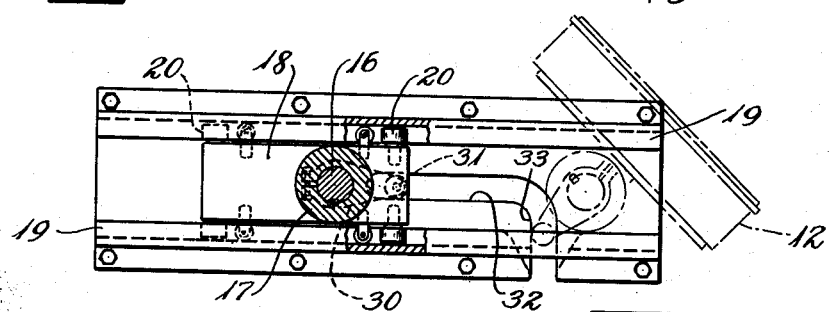
Figure 3:
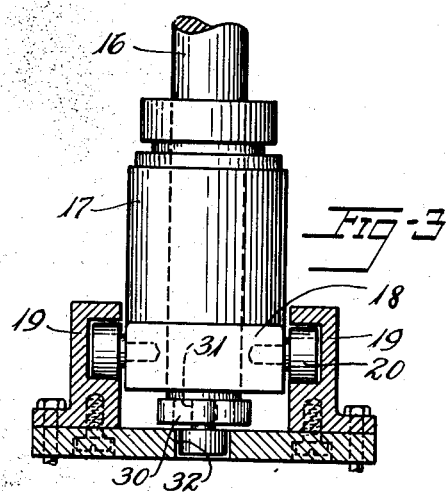

Of the drawings,

Fig. 1 is a front elevation of the building drum of a tire building machine and the bead-setting ring supporting mechanism therefor constructed in accordance with and embodying the invention, the bead-setting ring and its support being shown in the bead-setting position in full lines and in the displaced position in dot-and-dash lines, Fig. 2 is a sectional plan view taken on line 2—2 of Fig. 1, Fig. 3 is a sectional view taken on line 3—3 of Fig. 1.

Referring to the drawings, the numeral 10 designates a rotatable horizontal shaft of a tire building machine and the numeral 11 designates a collapsible tire building drum mounted on shaft 10 for rotation therewith. To be normally positioned at the outboard end of the drum 11 and in axial alignment therewith is a bead setting and supporting ring 12. The ring 12 is mounted upon a flange 13 rotatably supported upon a stub shaft 14, a ball bearing 15 being mounted therebetween to reduce friction. The stub shaft 14 is supported by a vertical support 16 rotatably mounted on a vertical axis in a bearing 17, the bearing being a portion of a carriage 18. Carriage 18 is mounted for movement along a guideway 19, the carriage being provided with anti-friction rollers 20 for engaging the guideway. For moving the carriage 18 along the guideway in a direction parallel to the axis of the drum 11, a double-acting fluid pressure operated cylinder 24 is mounted on the guideway 19 and its piston 25 has a rod 26 connected at 27 to the carriage 18. Pipes 28, 29 connected to opposite ends of the cylinder provide for a flow of fluid to and from the respective ends of the cylinder and these pipes are connected to a convenient source of fluid pressure (not shown) through a suitable control valve (not shown) whereby the piston 25, and with it the carriage 18, may be moved longitudinally of the guideway, moving the bead-placing ring 12 with it axially toward and from the tire building drum.

For further control movement of the bead-placing ring, the lower end of the support 16 has a crank arm 30 fixed thereto. This crank arm has a wrist pin 31 projecting downwardly therefrom and having a roller entering a cam groove 32. The groove 32 extends first in a direction parallel to the guideway and then turns to an angle of substantially 90°, as at 33. The arrangement is such that as the carriage 18 is moved to the right in Figs. 1 and 2, the wrist pin 31 first follows the groove 32 and during this reach of the cam groove, the bead-placing ring 12 is moved axially of the drum 11 and in alignment therewith. Thereafter, the wrist pin enters the bent portion of the groove beyond the straight reach of the groove 32 of the cam and this rotates the support 16 about its vertical axis. The bead-placing ring is rotated thereby to the dot-and-dash position of Figs. 1 and 2.

The bead-placing ring 12 is preferably of the type shown in the copending application of Frank Sternad, Serial No. 102,829, filed July 2, 1949, now U. S. Patent No. 2,595,423, the ring having a wide cylindrical portion which defines with the flange 13 a cupped receptacle for storing the flippered bead until such time as it is to be placed upon the drum and the ring also having a groove in its cupped margin for the purpose of positioning the inextensible portion of the bead core.

In the operation of the apparatus, the underbead plies 40 of tire building material generally in the form of rubberized cord or cord fabric, are laid about the drum 11 and their margins, which extend beyond the drum at the sides thereof, are formed inwardly about the shoulders of the drum. The bead-setting rings are then positioned over the inwardly turned margins of the cord fabric and this, as to the outboard bead core, is accomplished by mounting the bead core in the groove of the bead-placing ring, the ring being in the dot-and-dash position of Figs. 1 and 2. By operating the piston 25 the carriage 18 is moved toward the tire building drum and the bead-placing ring is turned in to a position parallel with the tire building drum and then moved axially thereof until the inextensible portion of the bead core impinges against the cord plies of the tire, the flipper strips extending outwardly of the drum. These flipper strips are then formed back over the cord fabric on the drum and the over-bead plies of cord fabric may be applied thereover. At this stage of the operation, the piston 25 is again manipulated to move the bead-placing ring away from the drum in order to permit forming of the under bead plies outwardly about the bead core.

It is to be understood that while the outboard bead-placing ring is being employed to place beads at the outboard margin of the drum, a bead-placing ring at the inboard margin is employed to place the opposite bead. However, the bead-placing ring at the inboard side of the drum does not require the same manipulation and forms no part of the present invention.

The carriage 18 and the vertical support 16 provide great stability and this construction permits rolling and stitching operations to be performed over the bead-placing ring 12 without displacement of the ring form from the drum. The crank arm and cam arrangement provide conveniently for the swinging of the bead-placing ring out of the way of the operator and accomplishes this without requiring a great amount of force as the bead-placing ring does not require lifting at any time.

Variations may be made without departing from the scope of the invention as it is defined by the following claims.

We claim:

1. Bead-setting mechanism for a tire-building drum mounted for rotation about a horizontal axis, the mechanism comprising a bead-placing ring coaxially engageable with an end of the drum, a support member for rotatably supporting the ring in said coaxial position, a guideway disposed horizontally below the building drum, a carriage in the guideway engaged with the support member and movable along the guideway to move the bead ring coaxially relative to the building drum, the support member extending vertically downward from the bead ring and having its lower end rotatably supported in the carriage and projecting below the carriage to the bottom of the guideway, an arm projecting along the guideway below the carriage from said lower end of the support member, a groove along the bottom of said guideway to receive said arm, the groove being shaped to deflect said arm when the carriage is moved to the end of the guideway remote from the building drum for rotating the support member in a vertical position to swing the bead ring out of coaxial alignment with the building drum.

2. Bead-setting mechanism for a tire-building drum having a horizontal axis of rotation, the mechanism comprising a bead-placing ring coaxially engageable with an end of the drum, a support member for maintaining the ring in a position of coaxial alignment with the end of the drum, a guideway disposed horizontally below the building drum and having at least a portion extending axially beyond said end of the drum, a carriage movable in the guideway, the support member being rotatably connected to the carriage about a vertical axis, an arm projecting laterally from the support member parallel to the guideway, means for reciprocating the carriage in the guideway to move the ring translationally toward and away from the drum, and means in a portion of the guideway axially beyond said end of the drum for engaging said arm to rotate the support member relative to the carriage about said vertical axis for displacing the ring from said position of coaxial alignment.

3. Bead-setting mechanism for a tire-building machine having a building drum rotatable about a horizontal axis, the mechanism comprising a guideway disposed parallel to said drum axis, a carriage movable along said guideway, a bead-placing ring engageable coaxially with the end of the building drum, a vertical support for maintaining the bead-placing ring in a position coaxially aligned with the drum, the support being rotatably engaged with the carriage for rotation relative to the carriage about a vertical axis, means for reciprocating the carriage in said guideway to move the ring translationally in coaxial alignment with the drum from said engaged position to a position away from said end of the building drum, and means for rotating said support relative to the carriage to displace the ring from said coaxial alignment when the ring is at a position away from the drum.

4. Bead-setting mechanism for a tire-building drum mounted for rotation about a horizontal axis, the mechanism comprising a carriage below the drum movable horizontally in a direction parallel to said axis of the drum, a bead-placing ring, means pivotally secured to the carriage and rotatable relative to the carriage about a vertical axis for supporting the bead placing ring in coaxial alignment with an end of the drum, means for reciprocating the carriage to move the ring translationally in coaxial alignment with the drum toward and away from said end of the drum, and means for rotating said ring-supporting means relative to the carriage about said vertical axis to displace the ring from said position of coaxial alignment with the drum when the ring is at a position away from said end of the drum.

5. Bead-setting mechanism for a tire-building machine having a building drum rotatable about a horizontal axis, the mechanism comprising a bead-placing ring, means for supporting the ring in a position concentrically about said axis of the drum, means pivotally supporting said ring-supporting means for rotation about a vertical axis, the ring-supporting means being rotatable about said vertical axis to shift the ring into and out of said concentric position, means for reciprocating the ring translationally in said concentric position toward and away from an end of the drum, and means for rotating the ring-supporting means about said vertical axis when the ring is in a position away from the drum.

6. Tire-building apparatus comprising a tire-building drum rotatable about a horizontal axis, a bead-placing ring positionable at an end of said drum in axial alignment with the drum, a carriage movable in the axial direction of said drum, a support mounted on said carriage and rotatable relative thereto about an axis which extends vertically relative to the rotational axis of the building drum for positioning said bead-placing ring at said drum, and means in the path of said carriage for rotating said support about said axis of the support during movement of said carriage to position said ring out of axial alignment with said drum.

7. Tire-building apparatus comprising a tire-building drum rotatable about a horizontal axis, a bead-placing ring positionable at an end of said drum in axial alignment with the drum, a carriage movable in the axial direction of said drum, a support mounted on said carriage and rotatable relative thereto about an axis which extends vertically relative to the rotational axis of the building drum for positioning said bead-placing ring at said drum, and means in the path of said carriage for rotating said support about said axis of the support during movement of said carriage to position said ring out of axial alignment with said drum, said last said means comprising a stationary cam in the path of travel of said carriage and an arm secured to said support for engaging said cam.

8. Tire-building apparatus comprising a tire-building drum mounted for rotation about a horizontal axis through the drum, a carriage mechanism movable in a direction parallel to said axis of the drum, a bead-placing ring mounted on the carriage and movable with the carriage toward and away from an end of the drum, the ring being supported on the carriage for rotation relative to the carriage about two mutually perpendicular axes, the first of said axes having the ring located concentrically thereabout and extending coaxially of the drum when the ring is adjacent the drum, the second of said axes being disposed vertically relative to the axis of the drum at every position of the carriage relative to the drum, and the carriage mechanism including cam-operated means for rotating the ring about said second axis when the carriage has moved the ring to its most remote position from the end of the drum.

9. Tire-building apparatus comprising a guideway, a carriage movable back and forth along the guideway, an annular bead-placing ring for supporting a tire bead core, means for mounting the ring on the carriage for rotation relative to the carriage about the two mutually perpendicular axes, the first of said axes being horizontal and having the ring located concentrically thereabout and the second of said axes being vertical relative to said first axis at every position of the carriage in the guideway, and means disposed at one end of the guideway for rotating said ring-mounting means relative to the carriage about said vertical axis when the carriage is moved adjacent said means in the guideway.

10. Tire-building apparatus comprising a tire-building drum mounted for rotation about a longitudinal axis through the drum, a carriage movable backward and forward in a direction parallel to said drum axis, a bead-placing ring supported in coaxial alignment with the drum and rotatably mounted in the carriage on an axis which perpendicularly intersects the rotational axis of the drum, the ring being movable by the carriage coaxially toward and away from the drum with said axes maintained in said mutually perpendicular intersecting relation at every position of the carriage with respect to the drum, and means for rotating the ring relative to the carriage about said ring-supporting axis when the carriage is at a position away from the drum.

References Cited in the file of this patent

UNITED STATES PATENTS

| Number | Name | Date |
|---|---|---|
| 2,033,896 | Heston | Mar. 10, 1936 |
| 2,393,504 | Stevens | Jan. 22, 1946 |
| 2,394,465 | McChesney | Feb. 5, 1946 |
| 2,477,718 | Breth | Aug. 2, 1949 |
| 2,488,863 | Haase | Nov. 22, 1949 |
| 2,500,193 | Mallory et al. | Mar. 14, 1950 |